S. CHESKY.
ICE VELOCIPEDE.
APPLICATION FILED MAR. 20, 1911.
1,041,591.
Patented Oct. 15, 1912.
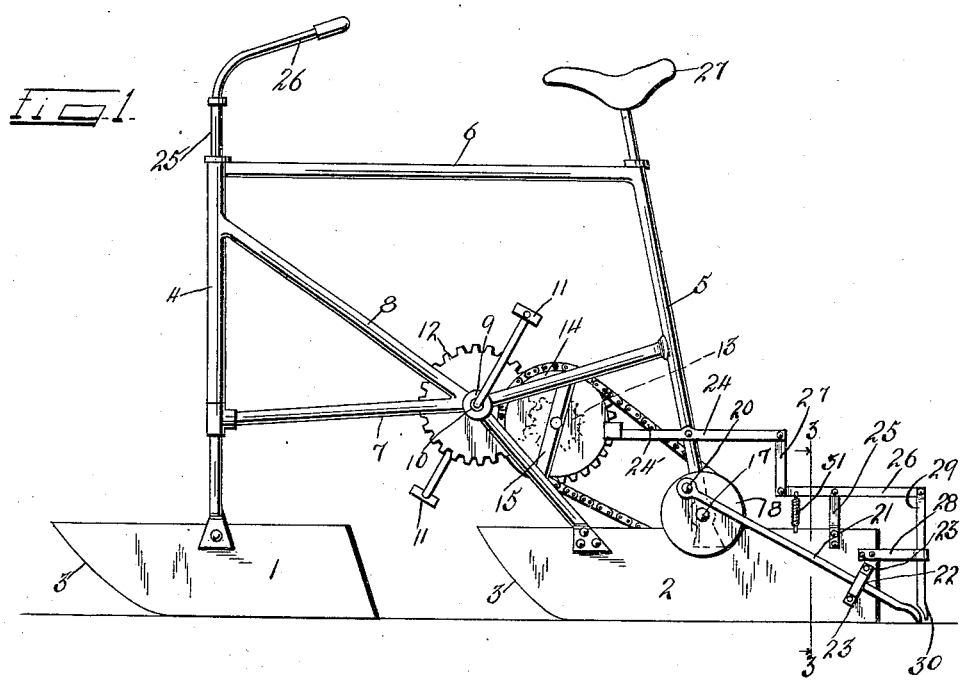
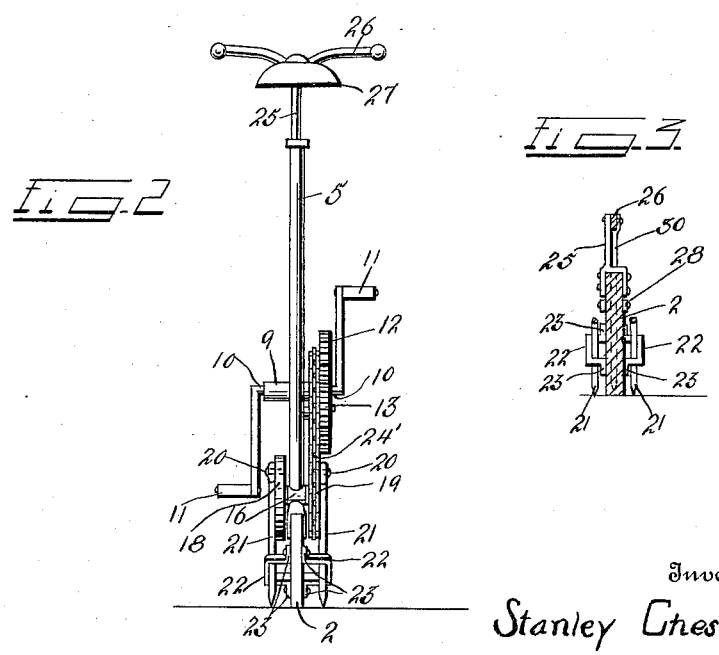
Witnesses
Inventor
Stanley Chesky.
By
Attorneys
COLUMBIA PLANOGRAPH CO., WASHINGTON, D. C.

UNITED STATES PATENT OFFICE.

STANLEY CHESKY, OF FLINTON, PENNSYLVANIA.

ICE-VELOCIPEDE.

1,041,591.  Specification of Letters Patent.  Patented Oct. 15, 1912.

Application filed March 20, 1911. Serial No. 615,648.

*To all whom it may concern:*

Be it known that I, STANLEY CHESKY, a citizen of the United States, residing at Flinton, in the county of Cambria, State of Pennsylvania, have invented certain new and useful Improvements in Ice-Velocipedes; and I do hereby declare the following to be a full, clear, and exact description of the invention, such as will enable others skilled in the art to which it appertains to make and use the same.

This invention relates to ice velocipedes, and has for its object to so construct a device of this character that the same may be quickly and positively propelled across the ice upon little exertion upon the part of the operator.

A further object of the invention is to provide a device of this character which is simple in construction, durable, and efficient in operation, and one in which the parts are reduced to a minimum.

With these and other objects in view, the invention consists in certain novel features of construction as hereafter shown and described and then specifically pointed out and claimed, and in the drawings illustrative of the preferred embodiment of the invention.

In the drawings, Figure 1 is a side elevation of the device. Fig. 2 is a rear elevation of the same. Fig. 3 is a sectional view taken on line 3—3 of Fig. 1.

Referring to the drawings the numeral 1 designates the front runner and 2 the rear runner, said runners being preferably formed from hardened steel, and have their forward ends curved as at 3 of the drawings so as to offer as little resistance as possible when being propelled.

The frame consists of a head 4 and rear upright 5, said head and rear upright being connected by a top bar 6 and lower bar 7. The frame is further provided with a diagonal bar 8. This bar is connected to the head 4 and extends downwardly and intersects with the lower bar 7 and from thence to the front end of the rear runner 2. The extreme lower end of the bar 8 is bifurcated and is secured at its point of connection with the runner 2 by bolts or the like. The rear upright 5 is also bifurcated at its lower end and is bolted or otherwise suitably secured to the upper edge of the rear runner 2. At the intersection of the bars 7 and 8 a bearing 9 is provided, and through which a crank shaft 10 is passed, said crank shaft being provided with the usual pedals 11.

Rigidly secured to the crank shaft 10, and adjacent the intersection of the bars 7 and 8 is a sprocket wheel 12, said sprocket wheel being adapted to mesh with a pinion 13 carried upon one face of a sprocket 14. The sprocket 14 is secured to the frame upon a brace 15 which brace has its opposite ends fastened to the rear ends of the bars 7 and 8.

In the lower end of the rear upright is a bearing 16 and through which a shaft 17 passes. To one end of this shaft is rigidly connected a disk 18 and to the other a sprocket wheel 19. The disk and sprocket wheel are arranged in spaced parallel relation, and each of which is provided with eccentrically arranged stub shafts 20. Pivotally connected to each stub shaft 20 is a propeller rod 21, the lower ends of the same being sharpened for engagement with the ice.

To both sides of the runner 2 and near the rear thereof are secured guides 22, each of said guides being formed from strap metal and being formed substantially U-shaped and having feet 23, and by which the same are secured to the runner. The lower ends of the rods 21 are adapted to work within the guides 22, said guides acting to positively bring said rods into engagement with the ice.

A sprocket chain 24' passes over and around the sprocket 14 and sprocket wheel 19.

Passing through the head 4 is a steering post 25, said post having its lower end bifurcated and pivoted to the front runner 1 in any suitable manner. The steering post 25 is provided with the usual handle bars 26.

As the frame proper is preferably formed from tubular metal, a seat 27 is readily attached in the upright 5, said seat and steering post may be adjusted in the usual manner to accommodate the operator.

To operate the device it is only necessary that the rider rotates the sprocket wheel 12 which will impart movement to the sprocket 14 through the pinion 13 and rapidly rotate the disk 18 and sprocket wheel 19 thereby compelling the propelling rods 21 to reciprocate, the guides 22 directing the points of the same into engagement with the ice, whereby the velocipede may be propelled and may be guided in any direction by the manipulation of the handle bars.

A brake mechanism is employed and consists of a foot lever 24, said lever being pivotally connected near the lower end of the rear upright 5. To the rear runner is secured a bracket 25, which pivotally supports a bar 26, said bar being connected to the outer end of the foot lever 24 at its inner end by a link 27. Pivotally secured to the outer end, and adapted to operate in a guide 28 is a vertically arranged brake lever 29 having its lower end formed with a point 30 for engagement with the ice to stop the velocity when pressure is applied to the foot lever. A coil spring 31 normally holds the point 30 from engagement with the ice.

What is claimed is:—

The combination with a frame including front and rear upright bars, upper and lower bars connecting the front and rear bars and a diagonal brace bar connected to the front bar and extending toward the rear bar, of a steering post extending through the front bar, a front runner connected to the lower end of the steering post, a rear runner connected to the lower end of the rear upright bar and the lower end of the diagonal brace bar, a crank bearing formed at the intersection of the diagonal brace bar and the lower bar, a crank journaled in said bearing, a sprocket wheel fast on said crank, a drive pinion meshing with said sprocket wheel, a second sprocket wheel to which said pinion is connected, a shaft passing through the lower end of the rear upright bar, a sprocket wheel fast with one end of said shaft, a disk fast with the other end of said shaft, an endless drive chain connecting the last mentioned sprocket wheel in driven engagement with the pinion carrying sprocket wheel, and propelling rods pivoted eccentrically to the disk and the sprocket wheel on the same shaft with the disk and extending therefrom rearwardly, and guides at the sides of the rear runner for the propelling rods.

In testimony whereof, I affix my signature, in presence of two witnesses.

STANLEY CHESKY.

Witnesses:
ANTHONY CHESKY,
R. W. STEVENS.